(12) United States Patent
Ksiezopolski et al.

(10) Patent No.: US 8,382,124 B2
(45) Date of Patent: Feb. 26, 2013

(54) CORNER SEAL DEVICE

(75) Inventors: Edwin E. Ksiezopolski, Granger, IN (US); Norman L. Newhouse, Mishawaka, IN (US)

(73) Assignee: Lifetime Industries, Inc., Rogers, MN (US)

( * ) Notice: Subject to any disclaimer, the term of this patent is extended or adjusted under 35 U.S.C. 154(b) by 136 days.

(21) Appl. No.: 12/849,411

(22) Filed: Aug. 3, 2010

(65) Prior Publication Data
US 2012/0032406 A1 Feb. 9, 2012

(51) Int. Cl.
*F16J 15/02* (2006.01)
(52) U.S. Cl. .......................... 277/644; 277/637; 277/642
(58) Field of Classification Search .................. 277/630, 277/637, 641, 642, 644
See application file for complete search history.

(56) References Cited

U.S. PATENT DOCUMENTS

| | | | | |
|---|---|---|---|---|
| 3,667,177 A | * | 6/1972 | Biela | 52/278 |
| 4,671,026 A | * | 6/1987 | Wissinger | 52/35 |
| 6,419,238 B2 | * | 7/2002 | McComb | 277/630 |
| 7,614,676 B2 | | 11/2009 | Ksiezopolski et al. | |
| 7,614,677 B2 | | 11/2009 | Ksiezopolski et al. | |
| 8,123,231 B2 | * | 2/2012 | McComb | 277/630 |
| 2001/0054799 A1 | * | 12/2001 | McComb | 277/590 |

* cited by examiner

*Primary Examiner* — Gilbert Lee
(74) *Attorney, Agent, or Firm* — Botkin & Hall, LLP

(57) ABSTRACT

A corner seal device for use in combination with wiper seals used in slide-out rooms in recreational vehicles. The corner seal device has a first generally horizontal surface and a second generally vertical surface meeting to form a corner. A third surface extends obliquely from the first surface and has at least some portion that is above the first surface. An end wall may be used to connect the third surface to the second surface. The corner seal device may also be used with a wiper seal having an inner shelf that extends over the third surface of the corner seal device. The inner shelf may also have a C-channel at the end that covers the upper most portion of the third surface of the corner seal device.

8 Claims, 6 Drawing Sheets

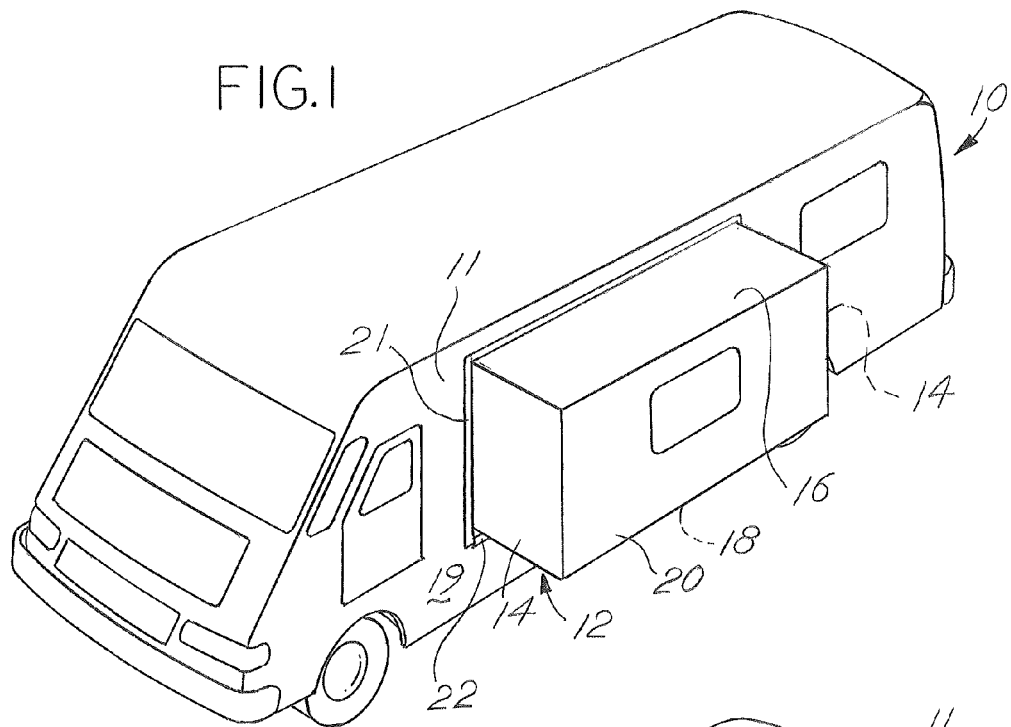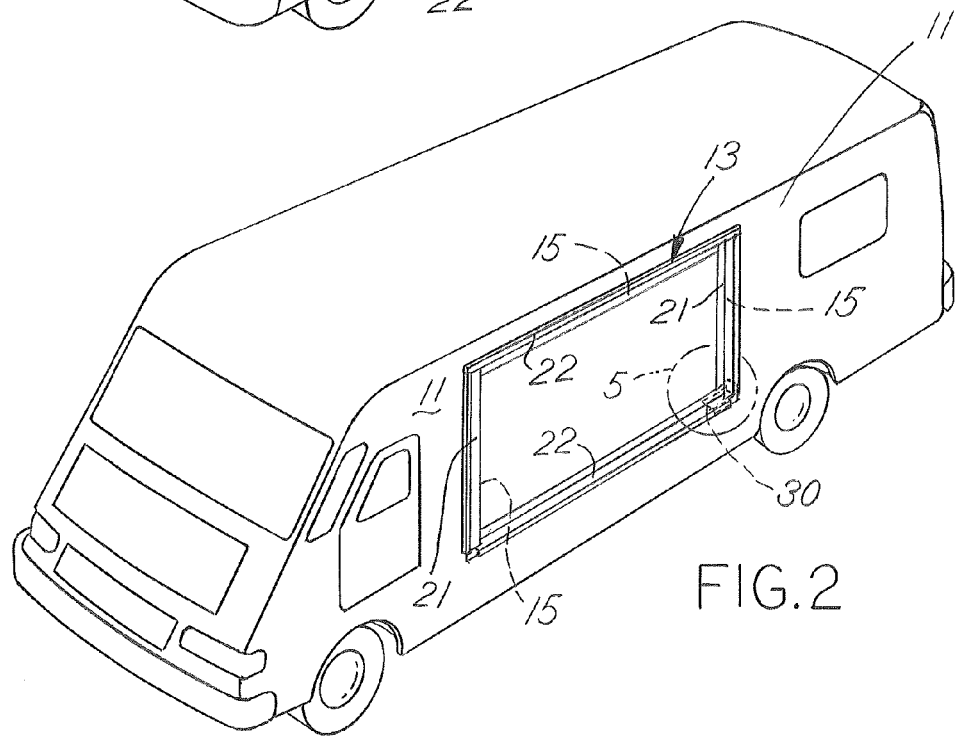

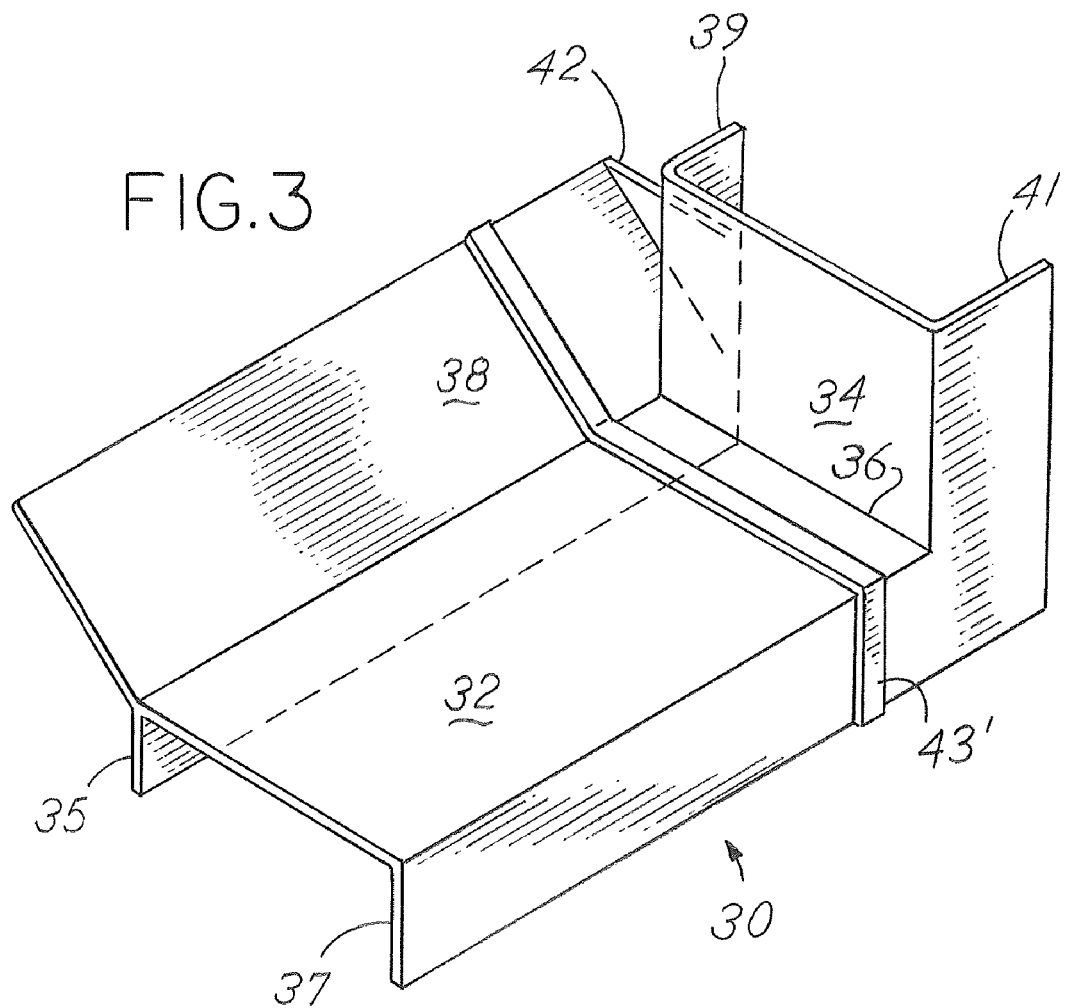

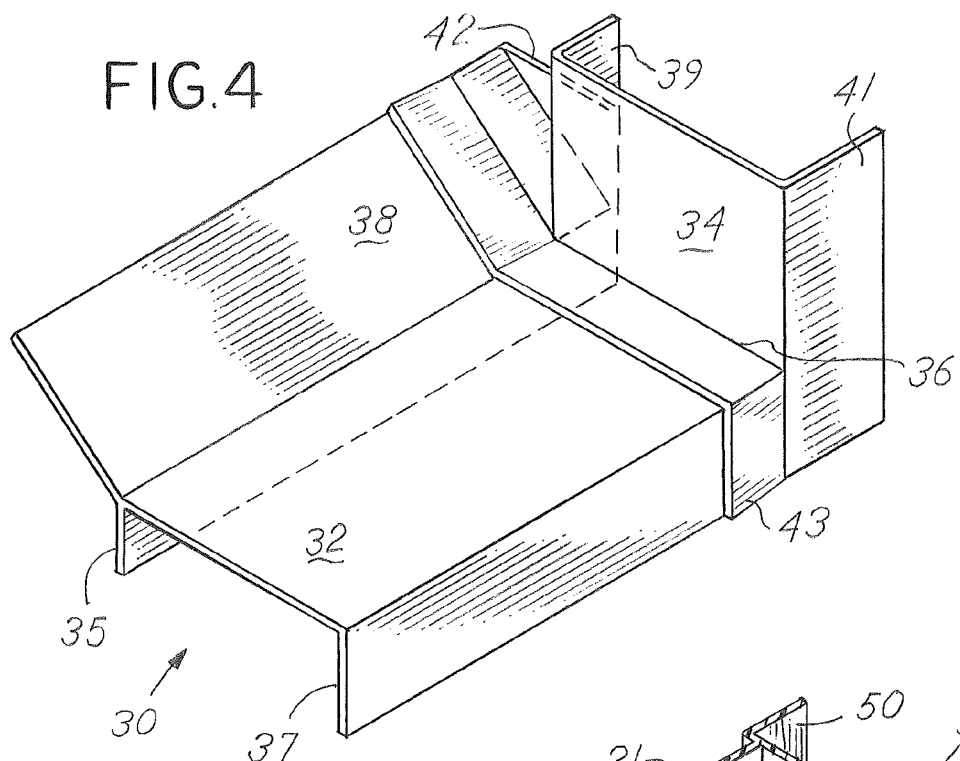
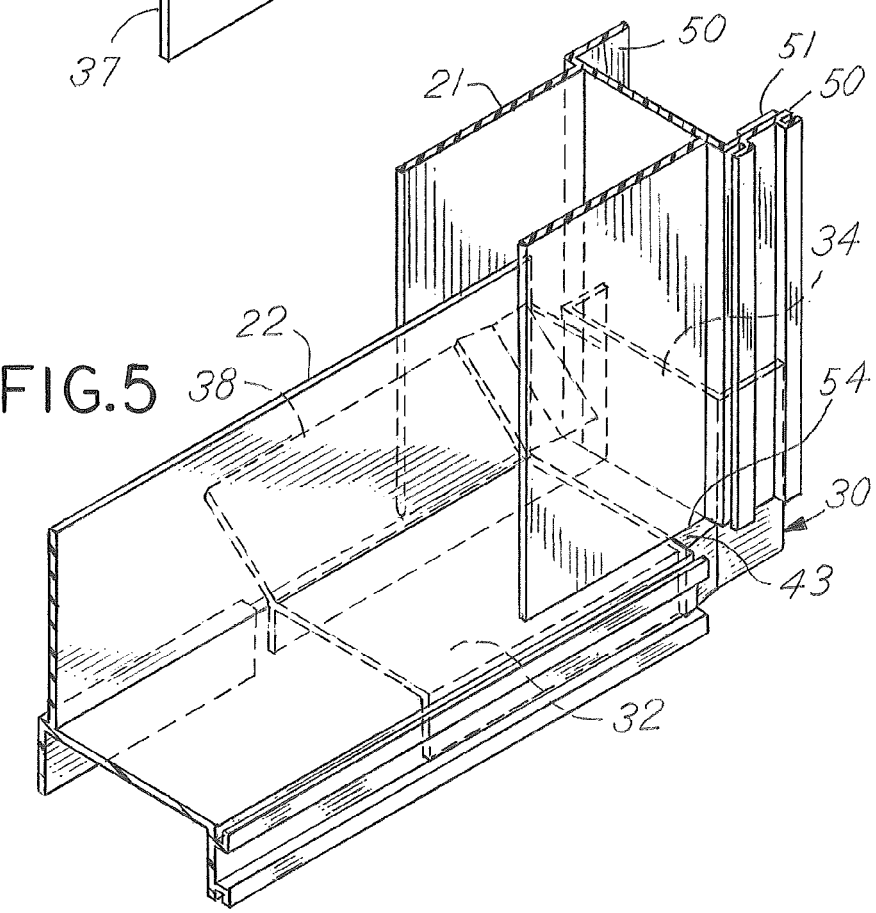

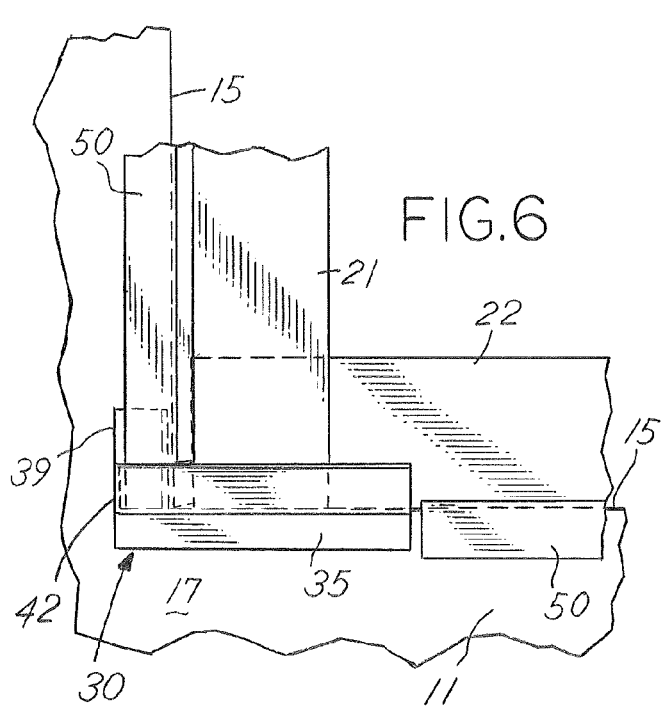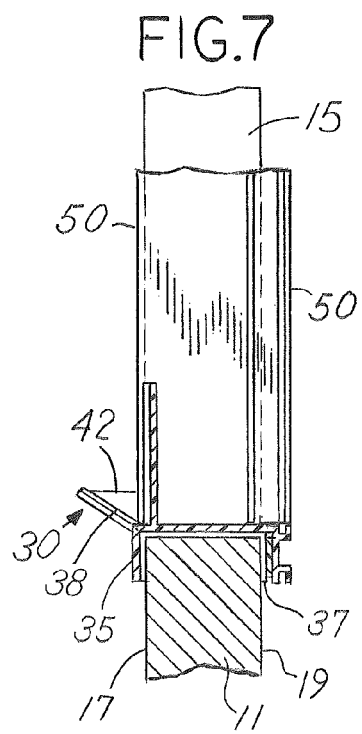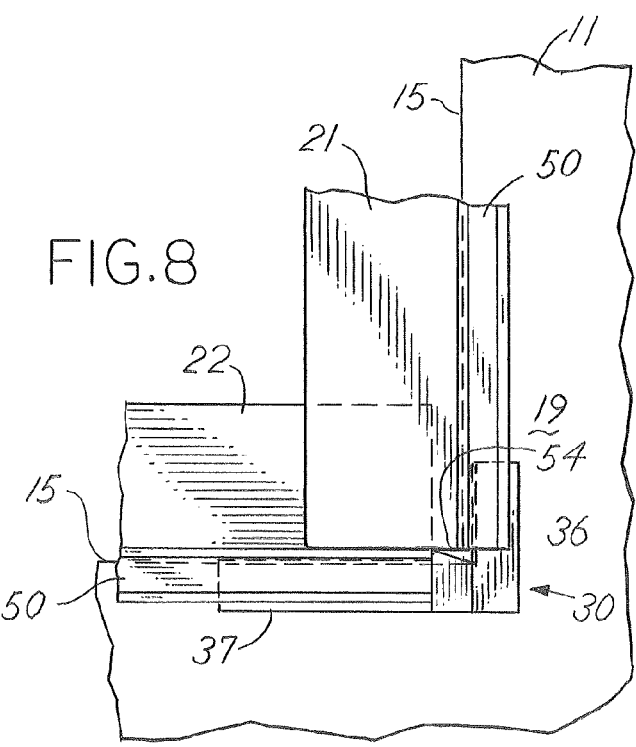

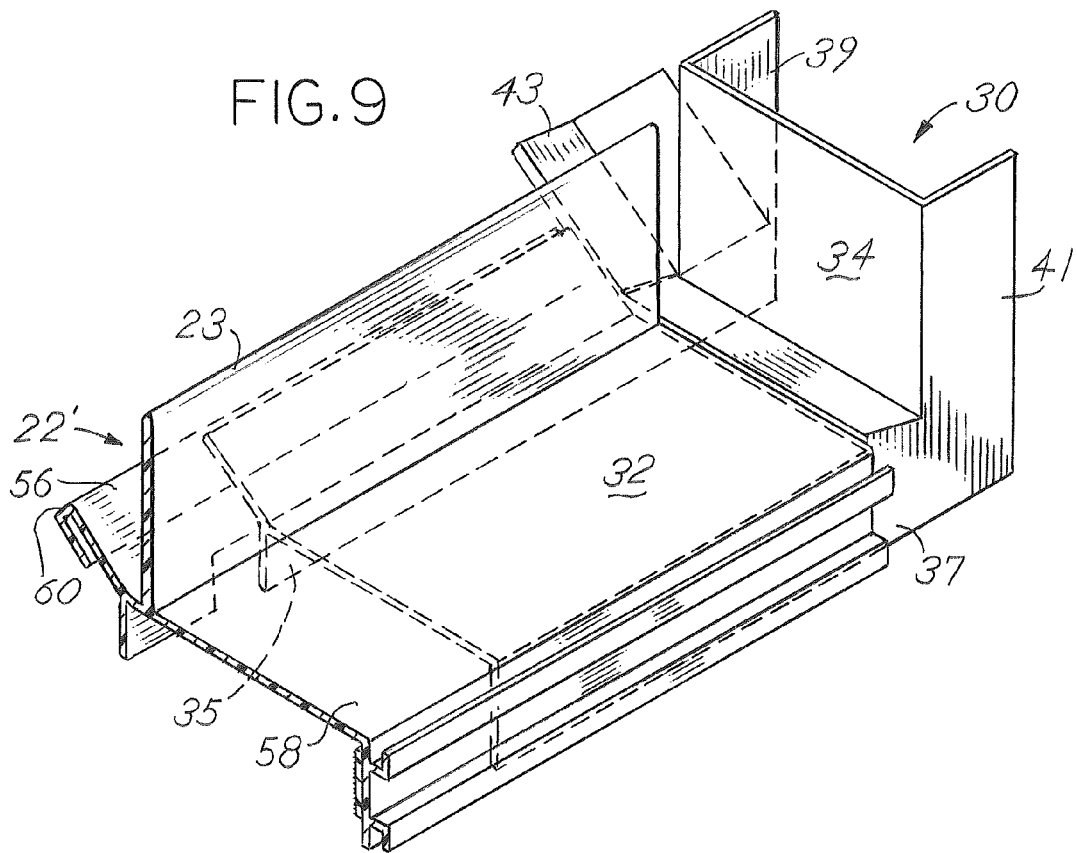
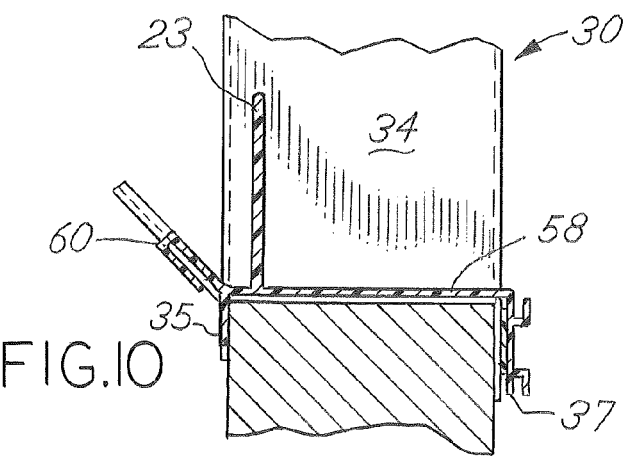

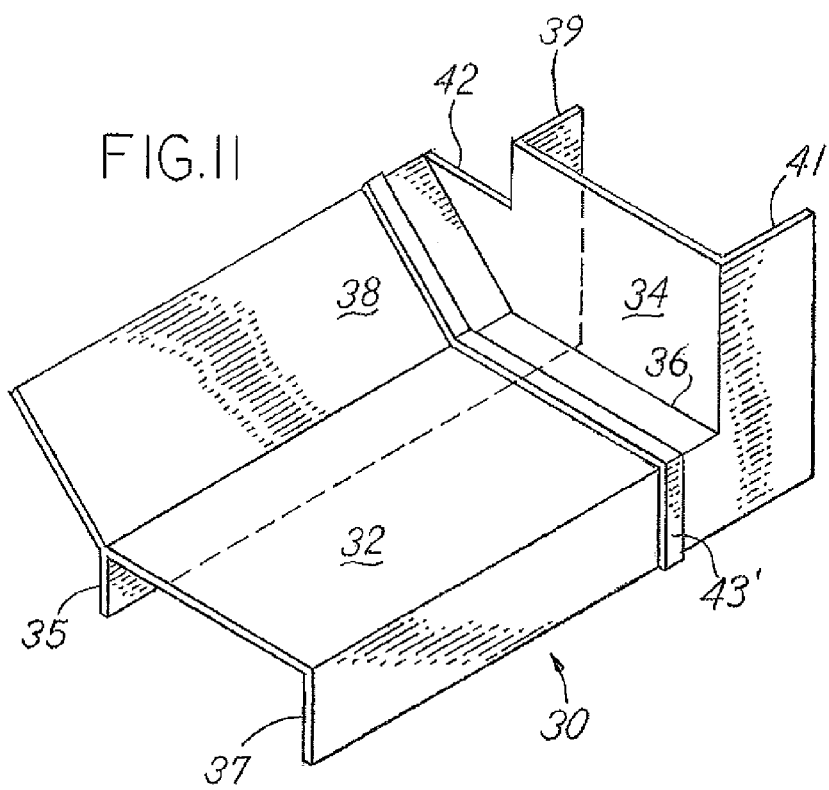

CORNER SEAL DEVICE

BACKGROUND OF THE INVENTION

Slide out rooms are common in recreational vehicles as a way to increase the useable interior space. Resilient seals are usually placed around the opening in the vehicle that the slide room is disposed within. Wiper seals are a common seal used to prevent the leakage of wind and water into the vehicle around the slide out room. Since the openings that accommodate the rooms are usually rectangular, the seals will meet at the corners. Making a tight leak proof connection in the corners is difficult, especially with wiper seals, because the seals have to be flexible enough to accommodate movement of the slide out room. In each corner there is a potential for leakage of water, wind, and also light.

There is a need for a device that will prevent the entrance of light, wind, and rain through the corners where the seals meet. Such a device should be easily installed and not interfere with the present method of sealing slide out rooms.

SUMMARY OF THE INVENTION

The present invention relates to a corner seal device that is useful for seals typically used with slide out rooms used in recreational vehicles. The corner seal device has a first generally horizontal surface and a second generally vertical surface that are contiguous at one end to define a corner. A third surface extends obliquely outwardly from the first surface. The third surface has a portion located above the first horizontal surface and connected to the second surface for some portion above the first horizontal surface.

The third surface may have an end wall that extends from the second surface and is connected to the third surface. At least a portion of the end wall extends above the first horizontal surface.

In another aspect of the invention, inner and outer flanges extend outwardly from the first surface and the flanges are spaced opposite each other. Flanges may also extend from the second surface.

The corner seal device of this invention may also be used in combination with a first wiper seal having a substantially horizontal surface including at least one wiper extending therefrom for interfacing with a slide-out room. The first wiper seal has an upwardly extending inner shelf that extends obliquely upwardly from its horizontal surface. The inner shelf of the first wiper seal overlies the third surface of the corner seal device. The inner shelf may also include a C-shaped channel that covers the upper most portion of the third surface.

BRIEF DESCRIPTION OF THE DRAWINGS

FIG. 1 is a perspective view of a recreational vehicle with a slide out room in an extended position;

FIG. 2 is a perspective view of the recreational vehicle shown in FIG. 1 with the slide out room removed to show the opening in which the room fits;

FIG. 3 is a perspective view of the corner seal having a raised line of material to form the ridge;

FIG. 4 is a perspective view of the corner seal having an angled ridge;

FIG. 5 is a perspective enlarged view of the wiper seals as they are assembled onto the corner seal in the lower right corner inside the circle labeled 5 in FIG. 2;

FIG. 6 is a view of the corner seal assembly shown in FIG. 5 as viewed from inside the vehicle;

FIG. 7 is a view looking from the center of the opening toward the lower right corner seal assembly shown in FIGS. 5 and 6;

FIG. 8 is a front view of the corner seal assembly shown in FIGS. 5, 6 and 7 as viewed from the outside of the recreational vehicle looking inward;

FIG. 9 is a perspective view of the corner seal assembly being used in combination with a wiper seal having an inner shelf covering the third surface of the corner seal device;

FIG. 10 is sectional view of the assembly shown in FIG. 9; and

FIG. 11 is a perspective view of the corner seal having the end wall aligned with the second surface.

DETAILED DESCRIPTION OF THE INVENTION

FIG. 1 shows a recreational vehicle 10 having a slide out room 12 incorporated within the vehicle 10. The vehicle has a sidewall 11 having a rectangular opening 13 in which the slide out room 12 is placed. The vehicle sidewall 11 has an inner surface 17 that faces the interior of the vehicle 10 and an outer surface 19 defining the exterior of the vehicle 10. The opening 13 has edge surfaces 15 that span between the inner surface 17 of the vehicle sidewall 11 and the outer surface 19 of the vehicle sidewall 11. The slide out room has sidewalls 14, a roof 16, a floor 18, and an outer wall 20. The slide out room 12 has a first extended position shown in FIG. 1, and a fully retracted second position in which the outer wall 20 is flush with the vehicle sidewall 11. The slide out room 12 is moveable between its first and second positions.

For the slide out room 12 to function there must be some space between the edge surfaces 15 of the opening 13 and the room 12 itself. Wiper seals 21, 22 have wipers 23 typically placed around the perimeter of the opening to prevent the leakage of air, water, and light around the slide out room 12 into the interior of the vehicle. Other types of edge seals may be used in place of the wiper seals 21, 22 to serve the same function.

The corner seal device 30 of this invention is designed to prevent the leakage of water in the lower corners of the opening 13 where the seals 21, 22 meet. FIG. 2 shows a perspective view of a first embodiment of the corner seal 30. The corner seal has a first generally horizontal surface 32 and a second generally vertical surface 34. An inner flange 35 and an outer flange 37 extend downwardly from the first surface 32. An inner flange 39 and an outer flange 41 extend outwardly from the second surface. The first surface 32 and second surface 34 meet to define a corner 36. A third surface 38 extends obliquely outward from the first surface 32 so that at least a portion of the surface extends above the first surface 32. An end wall 42 extends from the third surface 38 and connects to the inner flange 39. A ridge 43 on the first surface 32 extends upwardly and continues onto the third surface 38. The ridge may be an angled ridge 43, as shown in FIG. 4, or can be simply a raised line of material such as the ridge 43' shown in FIG. 3. The ridge 43' is spaced from the second surface 34 by a fixed distance.

The corner seal device 30 of this invention is typically used in a matched set with one device 30 in each lower corner of an opening 13, each being a mirror opposite of the other device 30. A corner seal device 30 is installed in each corner with an adhesive below the first and second surfaces 32, 34 where the device 30 contacts the edge surfaces 15 of the opening. The flanges 35, 37, 39, 41 straddle the vehicle sidewall 11 and help position the device 30 so that it is properly aligned within the opening 13. The third surface 38 is placed so that it is behind the inner surface 17 of the vehicle sidewall 11. Wiper seals 21, 22 that are often used to seal such openings 13 have flanges 50 that straddle the vehicle sidewall 11. The flanges 50 of the vertical wiper seal 21 straddle the flanges 39, 41 of the device 30. An adhesive strip 51 is typically placed on the outermost flange 50 of the seal. This adhesive strip 51 secures the flange 50 of the seal 21 to the outer surface 19 of the vehicle sidewall 11 and to the outer flange 37 of the device 30. The vertical seal 21 may touch or nearly touch the top of the ridge 43, but the seal 21 does not extend below the ridge 43. This leaves a gap 54 below the seal 21. The horizontal wiper seal 22 also straddles the vehicle sidewall 11. The flanges of the horizontal wiper seal 22 stop at the ridge 43 and typically no part of the horizontal wiper seal 22 extends beyond the ridge 43.

Another embodiment of the seal is shown in FIGS. 9 and 10. In this embodiment the wiper seal 22' has an upwardly extending inner shelf 56 that extends from a substantially horizontal surface 58 on the wiper seal 22'. The inner shelf 56 extends obliquely into the interior of the recreational vehicle 10. The inner shelf 56 has a C-shaped channel 60 at its upper-most portion. This C-shaped channel 60 covers the upper-most portion of the third surface 38.

When the vehicle 10 is exposed to rain and the room 12 is extended, water may potentially leak into the vehicle 10 when it runs down the seals 21. The horizontal seal 22 will prevent water from entering the vehicle 10 from below the room 12 for most of the distance between the corners of the opening 13. With the corner seal device 30 installed, potential leakage from the corners of the opening 13 is prevented. As water runs down the vertical seal 21 it will reach the ridge 43. The ridge 43 will prevent water from entering behind the horizontal seal 22. As water reaches the ridge 43, the slope of the ridge 43 is downward toward the corner 36. Water will run outward away from the center of the opening and into the corner 36 of the corner seal device 30. The sloped third surface 38 prevents water from running inward from the outside of the vehicle 10 to the inside of the vehicle. The third surface 38 is sloped downwardly toward the exterior of the vehicle 10. As water collects in the corner 36, it will tend to run along the ridge across the first surface 32. When water reaches the third surface 38, it will be unable to rise above the height of the third surface 38. Therefore, the water will run out of the gap 54.

In the embodiment shown in FIGS. 9 and 10, the inner shelf 56 will provide further protection from water leaking into the vehicle 10. The inner shelf 56 extends the entire length of the wiper seal 22'. As water reaches the inner shelf 56 between the corners of the opening 13, the water will be unable to rise above the inner shelf 56 before it runs out of the corners 36 of the corner seal device 30.

The corner seal device also prevents the entry of sunlight through the corners of the opening 13 where the seals 21, 22 meet. Customers who purchase recreational vehicles 10 containing slide out rooms 12 generally perceive light leaking through the corners of the slide out room 12 to be a defect. The third surface 38 prevents light from entering through the gap 54. As light enters the gap 54, it will be unable to rise above the third surface 38 and a customer inside the vehicle 10 will not see light from the exterior entering the vehicle through the corner.

This invention is not limited to the details above, but may be modified within the scope of the following claims.

What is claimed is:

1. A corner seal device for use with edge seals useful in openings for a slide-out room in mobile living quarters, said corner seal device comprising:

a first elongate generally horizontal surface having an outermost lateral edge and an innermost lateral edge, said lateral edges defining a width of said horizontal surface;

an outer flange integrally joined to said outermost lateral edge and extending downwardly from said outermost lateral edge and being substantially perpendicular to said first surface;

an inner flange integrally joined to said innermost lateral edge and extending downwardly from said innermost lateral edge and being substantially perpendicular to said first surface, said inner flange being opposed and parallel to said outer flange;

a second elongate generally vertical surface being integrally joined at an end with said first surface to define a corner, said second surface having an outermost lateral edge and an innermost lateral edge, said lateral edges on said second surface being aligned with corresponding lateral edges on said first surface, said second surface being substantially perpendicular to said first surface;

an outer flange integrally joined to said outermost lateral edge on said second surface and extending outwardly of said outermost lateral edge on said second surface and said outer flange on said second surface being substantially perpendicular to said second surface and said outer flange extending from said second surface being integrally joined and aligned with said outer flange extending from said first surface;

an inner flange extending outwardly of said innermost lateral edge on said second surface and being substantially perpendicular to said second surface and being located across from and parallel to said outer flange extending from said second surface, said inner flange extending from said second surface being integrally joined and aligned with said inner flange extending from said first surface;

a third surface integrally joined to said first surface and extending obliquely upwardly from said first surface oppositely of said flanges extending from said first surface, said third surface including a portion located above said first horizontal surface, said third surface being connected to said second surface for some portion above said first horizontal surface.

2. A corner seal device as claimed in claim 1, wherein said third surface is integrally connected to said innermost edge on said first surface and wherein said upper portion of said third surface extends away from said innermost flange extending from said second surface and is integrally connected thereto with an endwall being aligned with said second surface.

3. A corner seal device as claimed in claim 2 wherein said first surface includes a ridge extending upwardly therefrom, said ridge being spaced from said corner located where said first and second surfaces meet.

4. A corner seal device as claimed in claim 3 wherein said ridge extends upwardly onto said third surface.

5. A corner seal device for use with edge seals useful in openings for a slide-out room in mobile living quarters, said corner seal device comprising:

a first elongate generally horizontal surface having an outermost lateral edge and an innermost lateral edge, said lateral edges defining a width of said horizontal surface;

an outer flange integrally joined to said outermost lateral edge and extending downwardly from said outermost lateral edge and being substantially perpendicular to said first surface;

an inner flange integrally joined to said innermost lateral edge and extending downwardly from said innermost lateral edge and being substantially perpendicular to said first surface, said inner flange being opposed and parallel to said outer flange;

a second elongate generally vertical surface being integrally joined at an end with said first surface to define a corner, said second surface having an outermost lateral edge and an innermost lateral edge, said lateral edges on said second surface being aligned with corresponding lateral edges on said first surface, said second surface being substantially perpendicular to said first surface;

an outer flange integrally joined to said outermost lateral edge on said second surface and extending outwardly of said outermost lateral edge on said second surface and said outer flange on said second surface being substantially perpendicular to said second surface and said outer flange extending from said second surface being integrally joined and aligned with said outer flange extending from said first surface;

an inner flange extending outwardly of said innermost lateral edge on said second surface and being substantially perpendicular to said second surface and being located across from and parallel to said outer flange extending from said second surface, said inner flange extending from said second surface being integrally joined and aligned with said inner flange extending from said first surface;

a third surface integrally joined to said first surface and extending obliquely upwardly from said first surface oppositely of said flanges extending from said first surface, said third surface including a portion located above said first horizontal surface, said third surface being connected to said inner flange extending from said second surface for some portion above said first horizontal surface.

6. A corner seal device as claimed in claim 5, wherein said third surface is intergrally connected to said innermost edge of said first surface wherein said upper portion of said third surface extends away from said innermost flange extending from said second surface and is integrally connected thereto with an endwall.

7. A corner seal device as claimed in claim 6 wherein said first surface includes a ridge extending upwardly therefrom, said ridge being spaced from said corner located where said first and second surfaces meet.

8. A corner seal device as claimed in claim 7 wherein said ridge extends upwardly onto said third surface.

* * * * *